United States Patent [19]

Ozawa

[11] Patent Number: 5,402,050
[45] Date of Patent: Mar. 28, 1995

[54] LOCOMOTION CONTROL SYSTEM FOR MOBILE ROBOT

[75] Inventor: Nobuaki Ozawa, Saitama, Japan
[73] Assignee: Honda Giken Kogyo Kabushiki Kaisha, Tokyo, Japan
[21] Appl. No.: 108,487
[22] Filed: Aug. 18, 1993
[30] Foreign Application Priority Data

Aug. 18, 1992 [JP] Japan ................... 4-241351
[51] Int. Cl.⁶ .......................... B25J 11/00; B25J 9/00
[52] U.S. Cl. ...................... 318/568.12; 318/568.1; 318/568.11; 180/8.6; 901/9
[58] Field of Search ............... 318/560–646; 901/1, 3, 5, 7, 15, 13, 33; 395/80–99; 414/730–735; 180/8.1–8.9

[56] References Cited

U.S. PATENT DOCUMENTS

| | | | |
|---|---|---|---|
| 4,834,200 | 5/1989 | Kajita | 180/8.1 |
| 5,151,859 | 9/1992 | Yoshino et al. | 180/8.6 X |
| 5,159,988 | 11/1992 | Gomi et al. | 180/8.6 |
| 5,206,569 | 4/1993 | Ozawa | 318/568.12 |
| 5,221,883 | 6/1993 | Takenaka et al. | 318/568.12 |
| 5,252,901 | 10/1993 | Ozawa et al. | 318/568.12 |
| 5,255,753 | 10/1993 | Nishikawa et al. | 180/8.6 |

FOREIGN PATENT DOCUMENTS

| | | |
|---|---|---|
| 62-97006 | 6/1987 | Japan . |
| 150176 | 6/1988 | Japan . |
| 3184782 | 8/1991 | Japan . |
| 4201187 | 7/1992 | Japan . |

OTHER PUBLICATIONS

1988 IEEE International Conference on Robotics and Automation, Apr. 24–29, 1988.
Automation in Construction, vol. 1 (Sep. 1992), "A 3-D navigation mechanism for autonomous biped robots to travel in the obstacle-filled world".
Proc. 1989 Int'l Conference on Robotics and Automation. vol. 2 (pp. 638–645), "On Replanning For Assembly Tasks Using Robots in the Presence of Uncertainties".
The International Journal of Roibotics Research (vol. 3, No. 92 1984) "Experiments in Balance with a 3D One-Legged Hopping Machine".
Proc. 1986 IEEE Int. Conf. on Autom. and Autom. vol. 2 pp. 1050–1055 "Continuously Motion Planning in Unknown Environment for a 3D Cartesian Robot Arm".
IEEE/RSJ Int. Workshop on Intelligent Robots and Systems IROS '91, Nov. 3–5, 1991, "A unified homing . . . mobile robots".
Proc. 1989 IEEE Int. Conf. on Robotics and Automation. vol. 2, pp. 1122–1127. "Torque Limited Path Following by On-Line Trajectory Time Scaling".
"Experiments in Balance with a 2D One-Legged Hopping Machine" (Raibert & Brown), published in Journal of Dynamic Systems, Measurement, and Control (Mar. 1984, vol. 106/75).
Journal of the Robotic Society of Japan, vol. 1, No. 3.
Journal of the Robotic Society of Japan, vol. 9, No. 5, pp. 638–643.
"Robots do the dirty work" (Fischetti).
"The Adaptive Suspension Vehicle", Chapter 9; Machines that Walk.
Dynamic Walking of Stilt-Type Biped Walking Robot
"Legged Robots on Rough Terrain: Experiments in Adjusting Step Length" (Hodgins), IEEE 1988.

*Primary Examiner*—Paul Ip
*Attorney, Agent, or Firm*—Lyon & Lyon

[57] ABSTRACT

A system for controlling locomotion of a biped robot discretely bringing its foot in contact with a floor in an environment such as that including stairs in which the robot's foot contact position is restricted. The robot's locomotion is controlled on the basis of predesigned gait parameters including its foot position/direction which determines foot landing position in a stair. A positional error is detected between the desired and actual foot landing positions in the stair. And, the gait parameters for the next stair is modified such that the foot landing position at the next stair is corrected in response to the detected error. With this arrangement, the error is not accumulated and does not exceed a premissible range which ensures the robot's stable walking. Thus, the robot's locomotion can be controlled in such a manner that the robot goes up and down the stairs consecutively.

21 Claims, 13 Drawing Sheets

$K(z) = k$ $I(z) = \dfrac{z}{z-1}$ $G(z) = g$ $U_n = P_n - P_{n-1} + k \cdot e_{n-1}$
$\phantom{U_n} = L + k \cdot e_{n-1}$

LOCOMOTION CONTROL SYSTEM FOR MOBILE ROBOT

BACKGROUND OF THE INVENTION

1. Field of the Invention

This invention relates to a locomotion control system for a mobile robot and more particularly to a system in which mobile robot is controlled to move at a high speed while keeping its posture in an environment such as stairs in which its motion is restricted.

2. Description of the Prior Art

Wheeled, crawler, legged or other types of mobile robots have been proposed. Among the numerous reports published regarding control technologies for the legged mobile robot includes some relating to the one-legged robot (Raibert, M. H., Brown, Jr. H. B., "Experiments in Balance with a 2D One-Legged Hopping Machine", ASME, J of DSMC, vol. 106, pp. 75–81 (1984)), the two-legged robot (J of the Robotic Society of Japan, vol.1, no. 3, pp. 167–203 (1983)), the four-legged robot (J of the Robotic society of Japan, vol. 9, no.5, pp. 638–648 (1991)), and the six-legged robot (Fischeti, M. A., "Robots Do the Dirty Work", IEEE, Spectrum, vol. 22, no.4, pp. 65–72 (1985) and Shin-Min Song, Kenneth J. Waldron, "Machines That Walk; The Adaptive Suspension Vehicle", The MIT Press Cambridge, Mass. Other reports have been published regarding techniques for real time generation of dynamically stable gait parameters for a robot with relatively few degrees of freedom (Shimoyama, "Dynamic Walking of Stilt-type Biped Walking Robot", Collected Papers of The Japan Society of Mechanical Engineers, book C, vol.48, no.433, 1445–1454 (1982) and "Legged Robots on Rough Terrain; Experiments in Adjusting Step Length", by Jessica Hodgins, IEEE (1988)), and also on techniques for offline generation of stable gait parameters for a robot with relatively many degrees of freedom (Japanese Laid-Open Patent Publication nos. 62(1987)-97006 and 63(1988)-150176). Also the assignee proposed the anthropoid biped robot in Japanese Patent Application No. 2(1990)-336,420 (Laid-open Patent Publication No. 4(1992)-201,187) etc.

Among them, a robot such as a legged mobile robot moves around discretely bringing its foot in contact with a floor. It is therefore necessary, when the robot moves around in an environment such as stairs in which floor contact position is restricted, that the robot foot is landed at a desired position. More specifically, when a biped robot goes up stairs as illustrated in FIG. 13, if the robot lands its foot on a stair at a position excessively behind that desired, contact area between the stair and the foot sole necessary for keeping its posture stable is so small that the robot loses its stability. On the other hand, if the robot places its foot at a position excessively before that desired, the free (swung) leg may interfere with the next stair, causing the robot loses its stability. Thus, when such a robot walks around in the environment in which its motion, i.e., floor contact position is restricted, it is necessary to control the relative positional relationship between the robot contact portion and the floor (stair).

In this respect, there have been proposed two techniques concerning foot landing control. In the first technique, the robot is provided at its foot end with a non-contact proximity sensor and the sensor outputs are successively processed to grope for a position to be landed. Namely, a foot landing position is felt with a free leg. In the second technique, a robot is controlled using modern control theory or the like in such a manner that its leg's vibration is suppressed so that the robot walks with a desired stride. It can be concluded that the two techniques aim to prevent a relative positional error between the robot foot and the floor (stair) from occurring. However, the first technique is disadvantageous in that the robot's walking speed is degraded, since it takes a considerable time for looking for a foot landing position. The second technique is disadvantageous in that it requires a high performance computer, resulting in complex structure and herece is expensive.

The object of the invention is therefore to provide a locomotion control system for a mobile robot in which the robot is able to stably move at a relatively high speed even in an environment such as stairs in which its motion is restricted.

Another object of the invention is therefore to provide a locomotion control system for a mobile robot in which the structure of the system is relatively simple and hence less expensive.

SUMMARY OF THE INVENTION

In order to achieve the objects, the present invention provides a system for controlling locomotion of a mobile robot which moves around in an environment in accordance with a discrete desired value defining a portion of the robot in terms of position or direction relative to an object of the environment, comprising, first means for detecting a relative relationship at a n-th desired value between the a portion of the robot and the object, and second means for determining a $n+m-$th desired value in response to the detected relative relationship.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained taking a legged mobile robot using biped locomotion as an example of a mobile robot.

Figure 1:
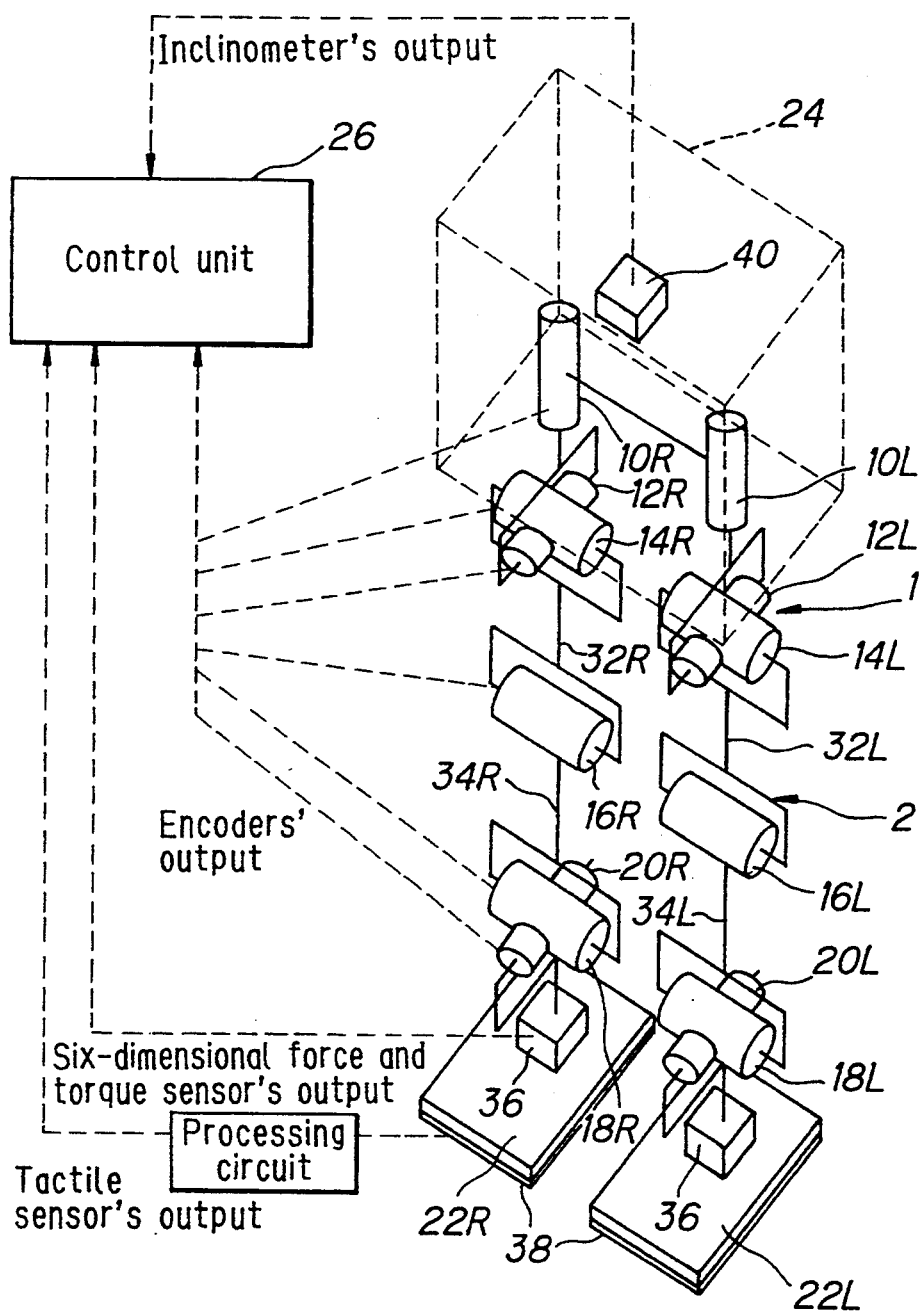
FIG. 1 is an overall view showing a locomotion control system for a mobile robot according to the invention taking a biped locomotion robot as an example of the mobile robot.

FIG. 1 is an overall skeleton view of a locomotion control system according to the invention. In the figure, a robot 1 has left and right legs 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a body (trunk) 24 is provided at the upper end, which houses electronic components such as a control unit 26 mainly made up of a microcomputer.

The hip joints in the foregoing structure are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L. The legs 2 thus have six degrees of freedom, so that during locomotion the legs as a whole can be caused to execute the desired motion by driving the 6×2=12 joints (axes) to appropriate angle. The robot is thus capable of walking freely within the three dimensional space. The joints are provided mainly with electric motors, as was mentioned earlier, and reduction gear mechanism for increasing motor torque. The structure of the joints is described U.S. Pat. No. 5,159,988 and since it is not essential aspect of the invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the feet and also measuring the moment of force components Mx, My and Mz about the three axes, the six-dimensional force and torque sensor 36 detects whether or not the associated foot has landed and the magnitude and direction of the forces and moment of forces acting to the robot through the supporting leg.

Figure 2:
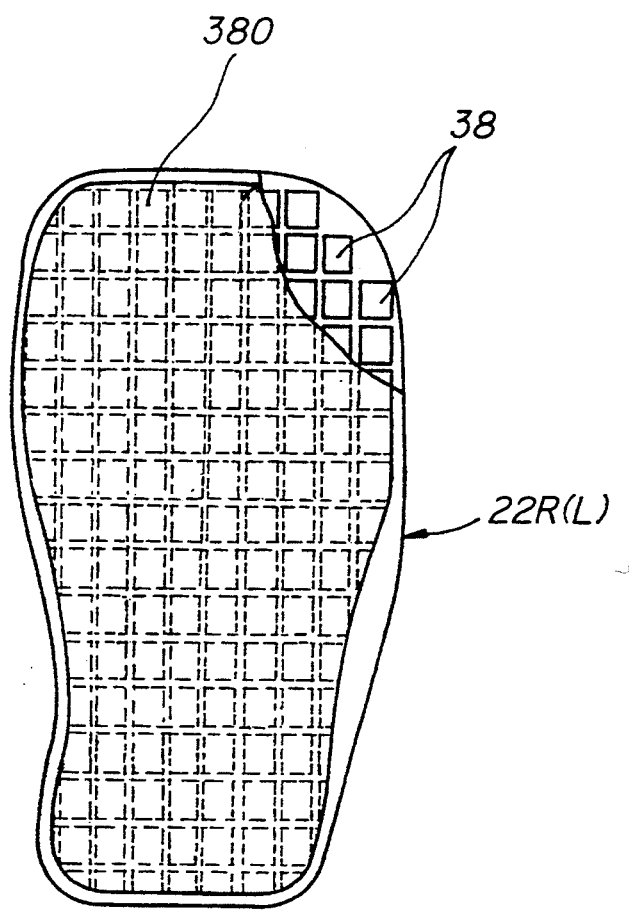
FIG. 2 is a plane, partially cut away, view of the foot sole of the robot illustrated in FIG. 1.

The sole of each foot 22R(L) is provided with a well-known conductive rubber tactile sensor 38 covered with a protective plastic coating 380, as is shown in FIG. 2. The sensor 38 has a conductive elastomer placed over a printed circuit board including many sensing sites arranged in a rectangular array. When the foot sole is in contact with an object, the elastomer at the contact portion is compressed to change electric resistance in the sensing site(s) corresponding thereto.

Figure 3:
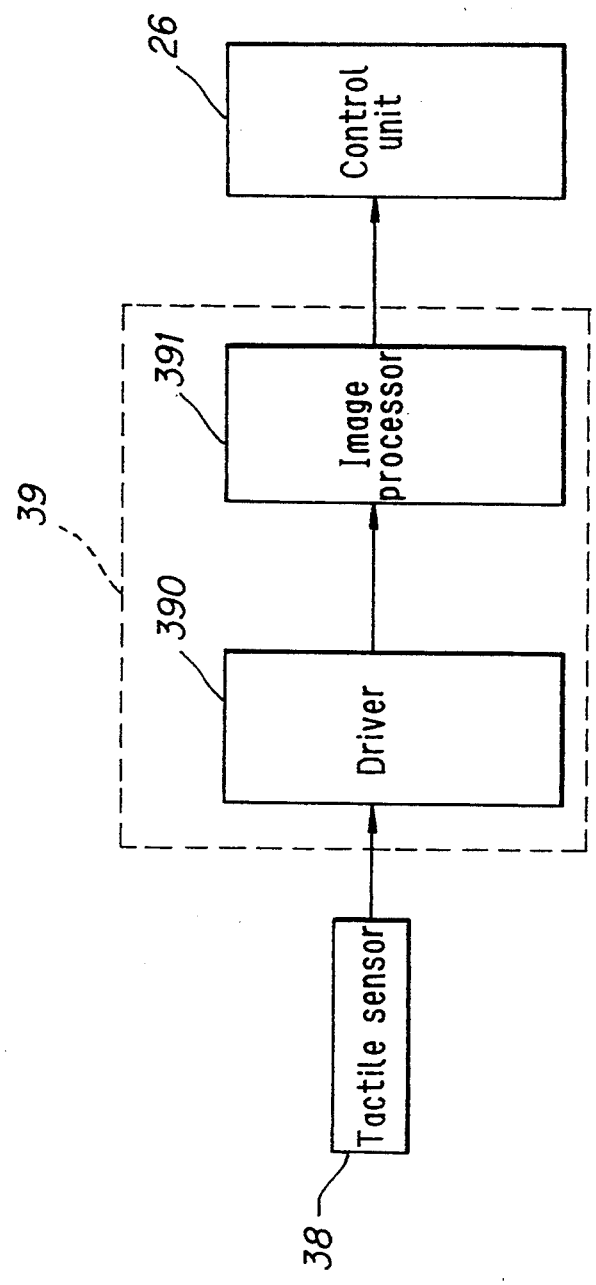
FIG. 3 is a block diagram showing the processing circuit of the tactile sensor illustrated in FIG. 1.

Outputs of the sensing sites are forwarded to a processing circuit 39. FIG. 3 is a block diagram showing the details of the processing circuit 39. The outputs in analog form are sent to the circuit 39 and first input to driver 390 in which they are scanned vertically and transversely in a known manner to be compared with threshold levels. Based thereon, the driver 390 generates video signals and send them to image processor 391. The processor 391 compares the signals with data stored in its memory to determine the profile of the object and the object contact portion at the foot sole and send the same to the control unit 26.

The top of the body 24 is provided with an inclinometer 40 for detecting the robot's inclinatory angle and angular velocity relative to z axis in the x-z and y-z planes. Each electric motor at the individual joints is provided with a rotary encoder for generating rotational information. And, although not illustrated in FIG. 1, the robot 1 is provided with a zero reference switch 42 for calibrating the output of the inclinometer 40 and a limit switch 44 for fail safe purpose. The outputs of the sensors 36 and the like are sent to the control unit 26 in the body 24.

Figure 4:
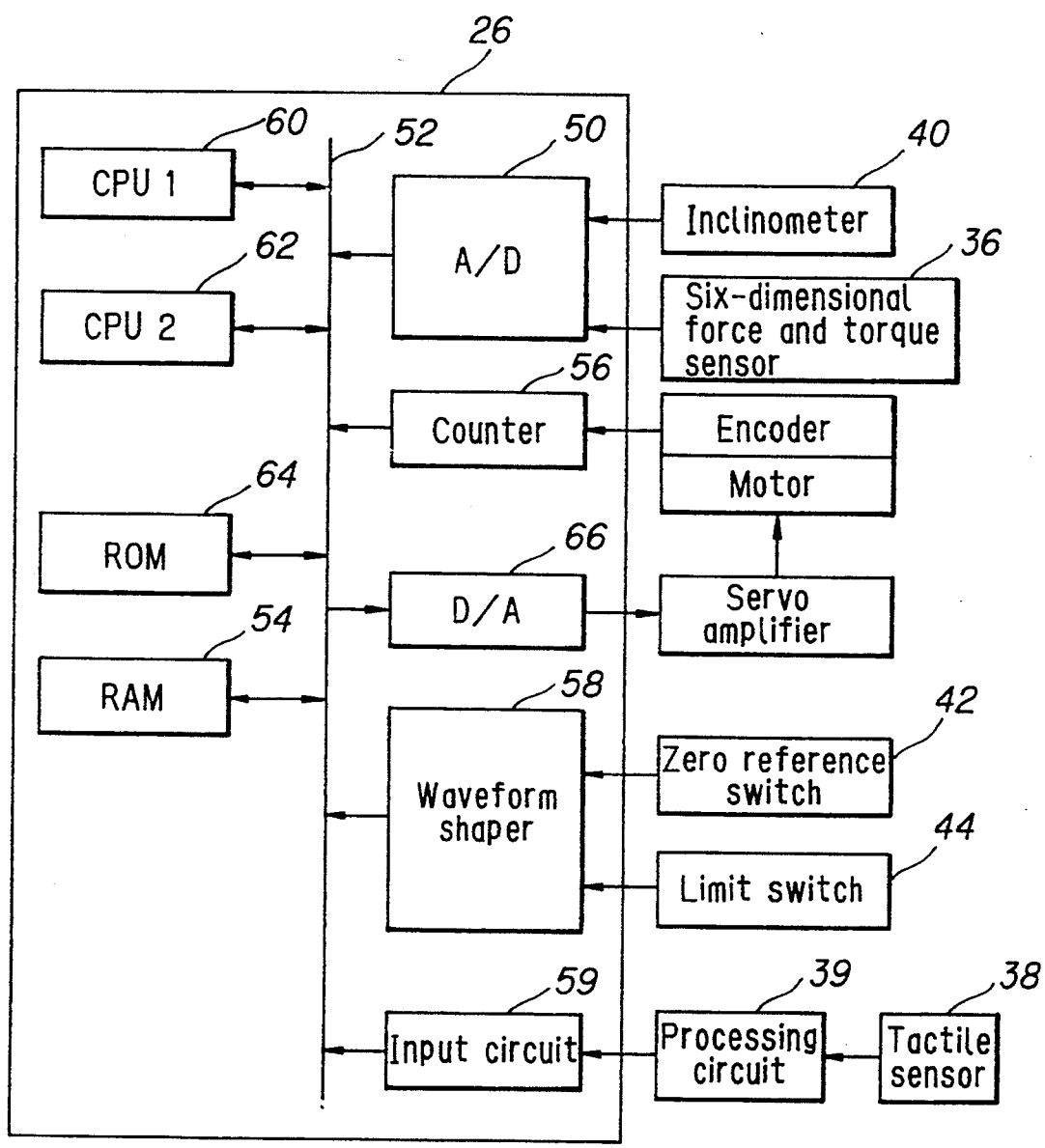
FIG. 4 is a block diagram showing the control unit illustrated in FIG. 1 and showing the structure of the locomotion control system according to the invention.

FIG. 4 is a block diagram showing the details of the control unit 26 mainly made up of a microcomputer. The outputs from the inclinometer 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the zero reference switch 42 and the like are stored in the RAM 54 via a waveform shaper 58. The output of the circuit 39 processing the tactile sensor's output are sent to the RAM 54 through an input circuit 59 and are stored there. The control unit 26 has a first processor 60, a second processor 62 and a ROM 64. The first processor 60 conducts inverse kinematic calculations on the basis of posture (gait) parameters to determine desired joint angles and outputs the same to the RAM 54. The second processor 62 fetches the desired joint angles and detected joint angles from the RAM 54, computes command velocities of the individual joint motors and sends the same to associated servo amplifiers thereof via a D/A converter 66.

Figure 5:
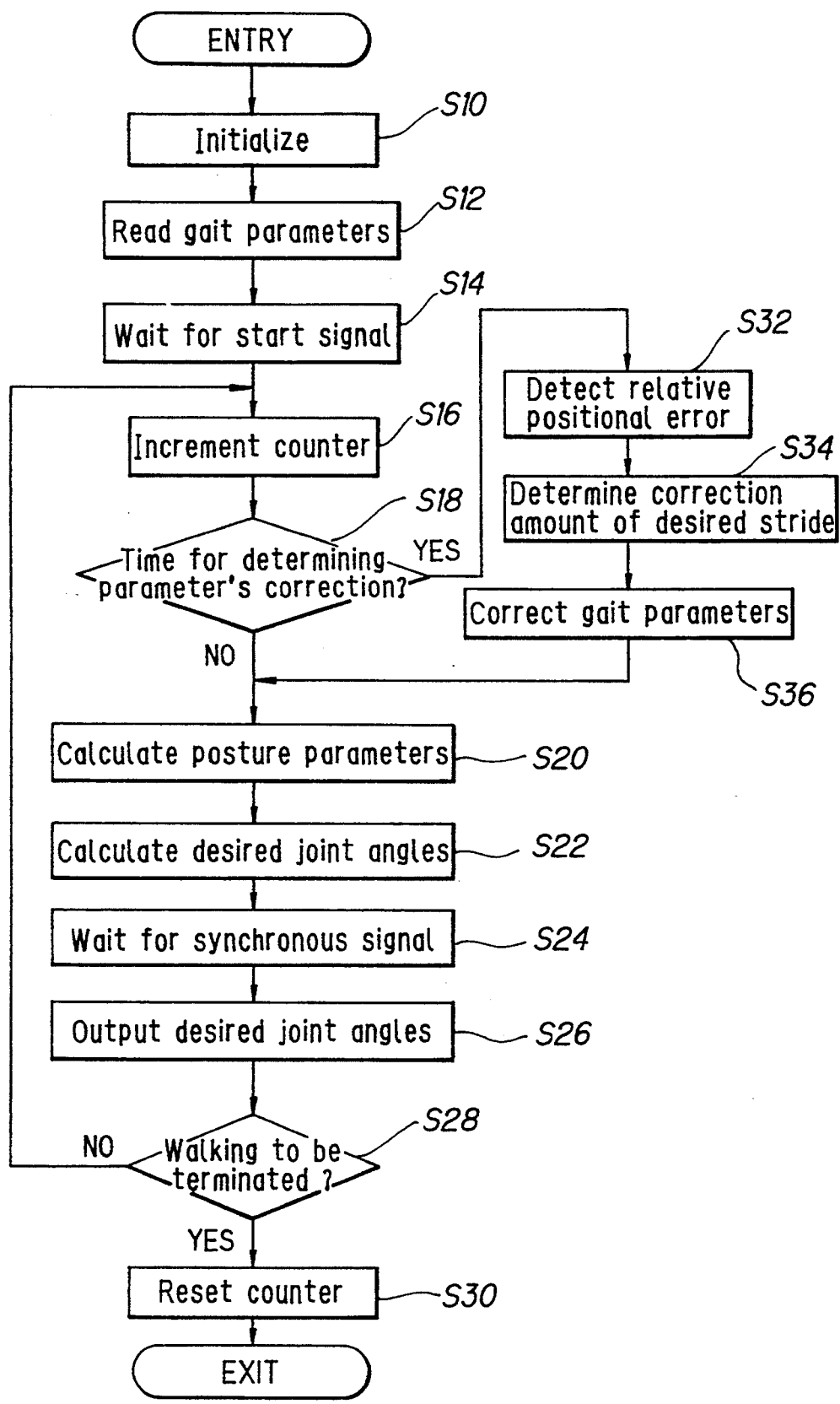
FIG. 5 is a flow chart showing the operation of the locomotion control system according to the invention.

The operation of the system will then be explained with reference to the flow chart of FIG. 5. Before entering into the explanation of the flow chart, however, the characteristic feature of the invention is explained in advance referring to FIG. 6 and on, taking the environment includes stairs as an example of the environment in which the robot motion is restricted.

The invention is based on the premise that the robot can be controlled to go up and down for several stairs without conducting a relative positional relationship between the desired and actual robot foot landing positions on an object in an environment such as stairs in which robot motion is restricted. In other words, the invention is based on the premise that the relative positional relationship between the desired and actual robot foot landing positions on a stair has an extent or region which ensures robot's stable walking and a positional error developed at each stair is relatively small. This will meet an actual environment. Namely, in the control according to the invention;

no accurate positional control is conducted for the foot landing;

a relative positional error is allowed to occur at any stair;

however, the relative positional error is controlled to be not accumulated such that it is always within the aforesaid extent or region which ensures robot's stable walking.

With the arrangement, it becomes possible to control the robot to go up and down stairs consecutively. The arrangement is advantageous over the first prior art technique in that it enables control of movement of the robot at a higher speed since no time a foot landing position search is needed. Also the arrangement is advantageous over the second prior art technique in that system structure is simple and less expensive since it requires a computer having performance not so high as is required in the second prior art technique.

Figure 6:
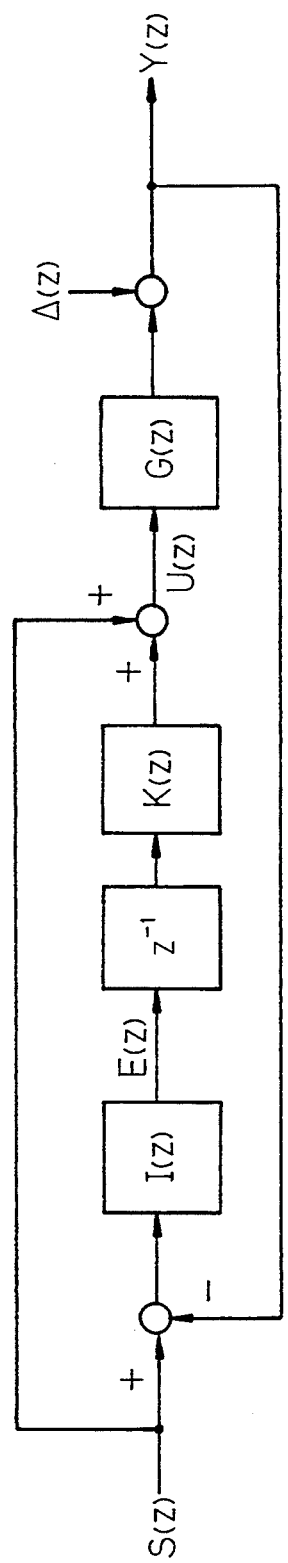
FIG. 6 is a block diagram showing the characteristic feature of the locomotion control system according to the invention.

FIG. 6 is a block diagram expressed in z-transformation showing the control system according to the invention. In the figure, S(z) means desired foot landing position (desired value); U(z) command stride (manipulated variable), Y(z) actual foot landing position (controlled variable), E(z) relative positional error (control error), delta(z) disturbance, I(z) integral element, (1/z) delay element per sampling, K(z) control system and G(z) transfer function of the robot (controlled object) between the command stride and actual stride. In the above, the desired foot landing position is directly determined in the gait parameters and the command stride is indirectly determined in the gait parameters, which will be discussed later. The relationships among them can be expressed as Equations 1 and 2 and FIG. 7.

$$Y(z) = \frac{G(z)\{1 + z^{-1}I(z)K(z)\}}{1 + z^{-1}I(z)K(z)G(z)} S(z) + \tag{1}$$

$$\frac{1}{1 + z^{-1}I(z)K(z)G(z)} \Delta(z) = \frac{G(z)\{z - 1 + K(z)\}}{z - 1 + K(z)G(z)} S(z) +$$

$$\frac{Z - 1}{z - 1 + K(z)G(z)} \Delta(z)$$

$$E(z) = \frac{Z\{1 - G(z)\}}{Z - 1 + K(z)G(z)} S(z) - \frac{Z}{Z - 1 + K(z)G(z)} \Delta(z) \tag{2}$$

For brevity, if it is supposed that G(z) and K(z) can be replaced with gain g and gain k, the condition of stability will be expressed as Equation 3.

Condition of stability $|Z \uparrow| < 1$ $$\left.\begin{array}{l} 1 - kg < 1 \rightarrow -kg < 0 \rightarrow kg > 0 \\ -1 < 1 - kg \rightarrow -2 < -kg \rightarrow kg < 2 \end{array}\right\} 0 < kg < 2 \tag{3}$$

Figure 7:
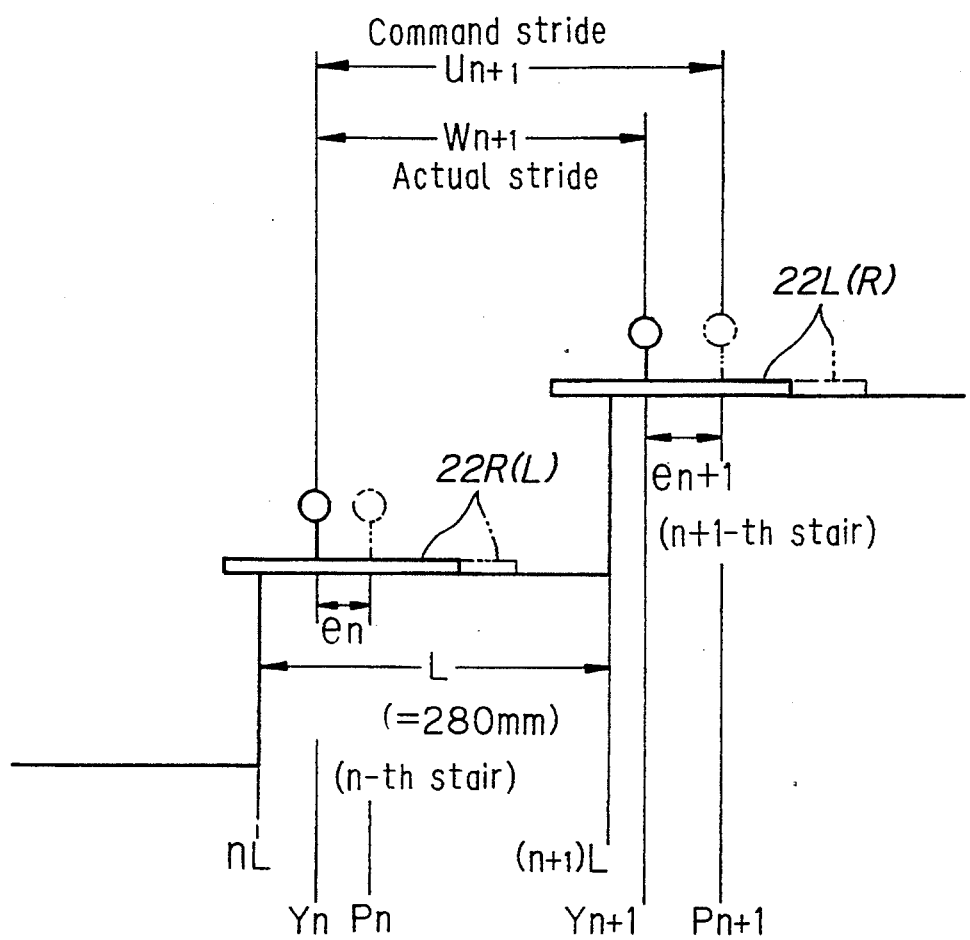
FIG. 7 is an explanatory view showing stairs taking an example of an environment in which the robot is expected to walk.

If stair length L, illustrated in FIG. 7, is supposed to be constant, desired position will vary in the step-like manner. A steady-state error will therefore be expressed as Equation 4 and will be converged on a certain value in response to the gains k, g and length L.

$$e\infty = \lim_{z \to 1} (1 - z^{-1}) \cdot \frac{z}{z-1} L \cdot \frac{z(1-g)}{z-1+kg} \tag{4}$$

$$= \lim_{z \to 1} \frac{z(1-g)}{z-1+kg} L$$

$$= \frac{1-g}{kg} L$$

When impulse-like disturbance or step-like disturbance with the magnitude of D occurs, a steady-state error will be expressed as Equations 5 and 6 respectively and will accordingly be 0 or converge on a certain value in response to the gains k, g and the magnitude D.

$$e\infty = \lim_{z \to 1} (1 - z^{-1}) \cdot z^{-e} \cdot D \cdot \frac{z}{z - 1 + kg} \tag{5}$$

$$= \lim_{z \to 1} \frac{(z-1) \cdot z^{-e}}{z - 1 + kg} D$$

$$= \frac{0}{kg} D$$

$$= 0$$

$$e\infty = \lim_{z \to 1} (1 - z^{-1}) \cdot \frac{Dz}{z-1} \cdot \frac{z}{z - 1 + kg} \tag{6}$$

$$= \lim_{z \to 1} \frac{z}{z - 1 + kg} D$$

$$= \frac{1}{kg} D$$

Thus, the gain k should preferably be set to be a value such that the relative positional error developed by the disturbance or the like is immediately converged and the steady-state error is within a tolerance limit. If the control system K(z) is configured to have an integral element, steady-state errors for a step-like desired value or the step-like disturbance will be 0.

Figure 8:
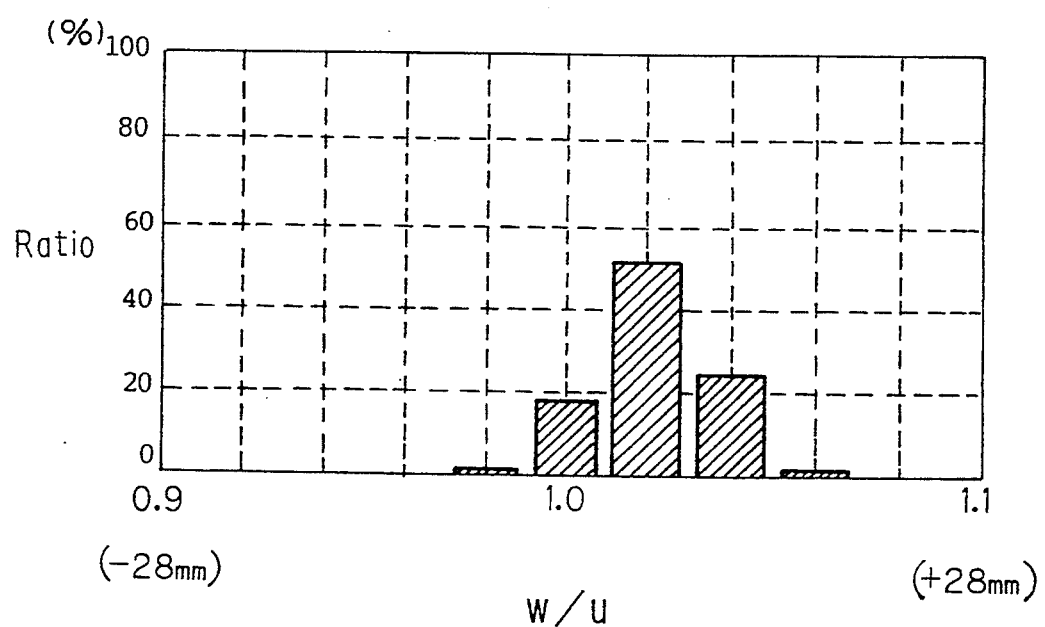
FIG. 8 is a histogram showing errors between desired and actual foot landing positions.

In the embodiment, G(z) is identified as the gain g as referred to earlier. FIG. 8 is a view in which values w(n)/u(n) (wherein w(n): actual stride and u(n): command stride) is expressed in a histogram. Here, as it is presumed that the reason why the rectangles broaden at the bottom is almost due to disturbance, it will not be improper if G(z) is identified as the gain g.

Properly speaking, G(z) excluding the influence from disturbance, namely, gain g itself should be identified. Since, however, it is difficult to detect actual stride w(n), the value w(n)/u(n) is used. In the figure, the distribution centers at 1.02. The gain g can consequently be estimated as 1.02. As a precaution, however, it is estimated as 1.06. The control system K(z) is expressed as the gain k as mentioned earlier. From Equation 3, the condition for the system to be stable at that instance will be $$0 < k < 1.89 (\approx 2/g)$$

It will be apparent from Equation 4 etc. that a steady-state error decreases with increasing gain k. In order to avoid the system from being vibrational and to assign a margin to the gain, the gain k is set to be 0.5 or 0.75.

Figure 9:
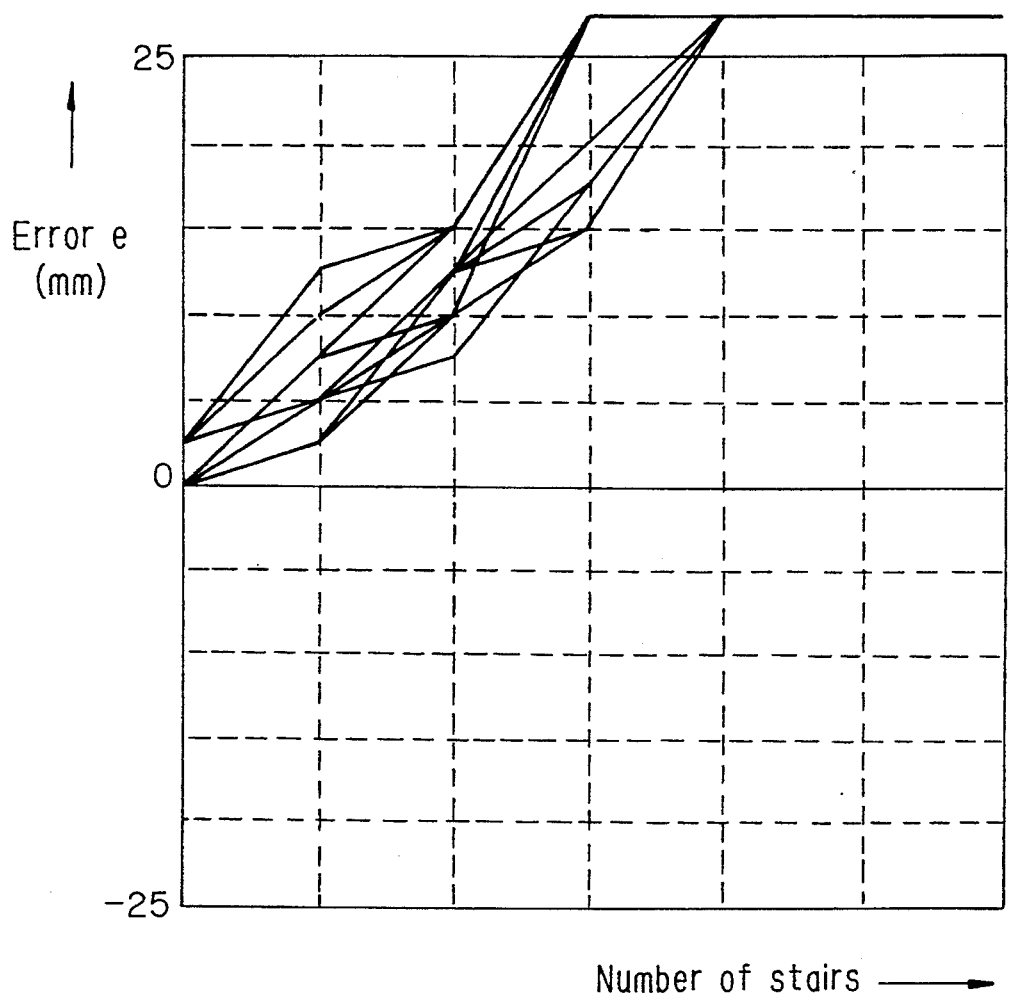
FIG. 9 is test data showing errors between desired and actual foot landing positions when the control according to the invention was not conducted.
Figure 10:
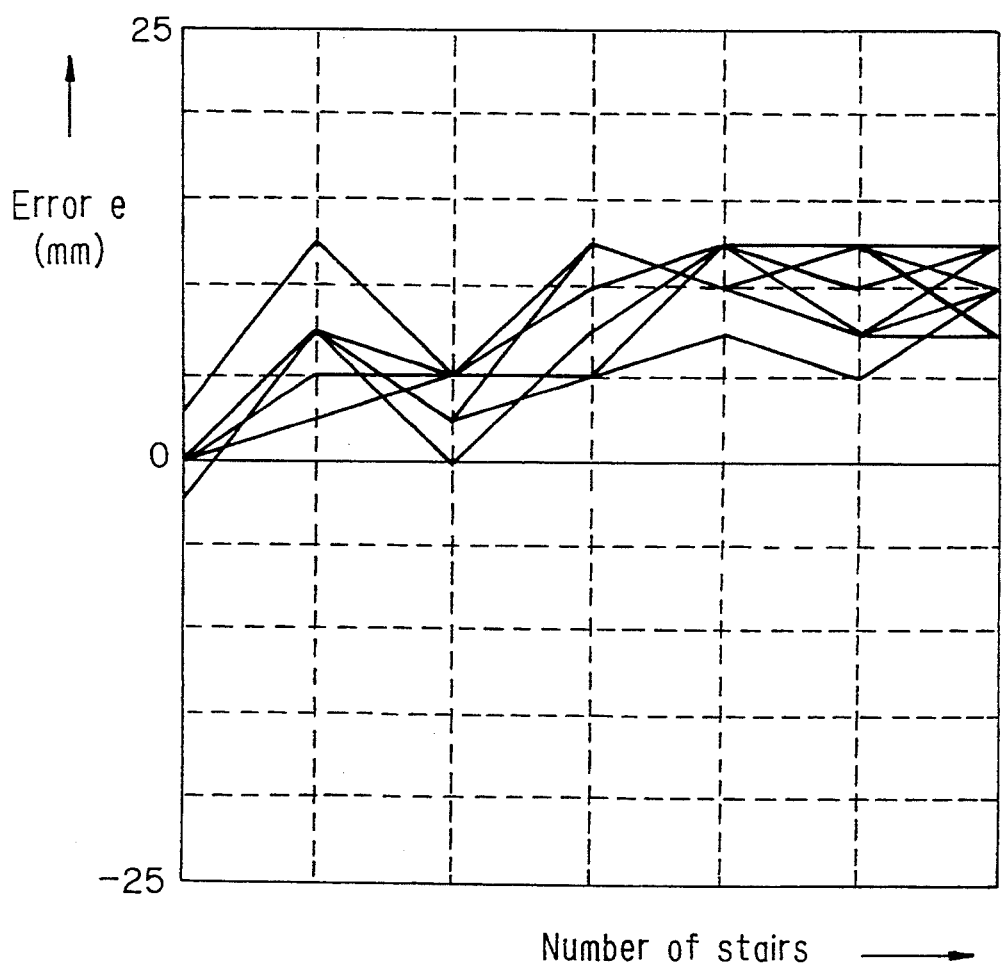
FIGS. 10 and 11 are views similar to FIG. 9, but show test data when the control according to the invention was conducted.
Figure 11:
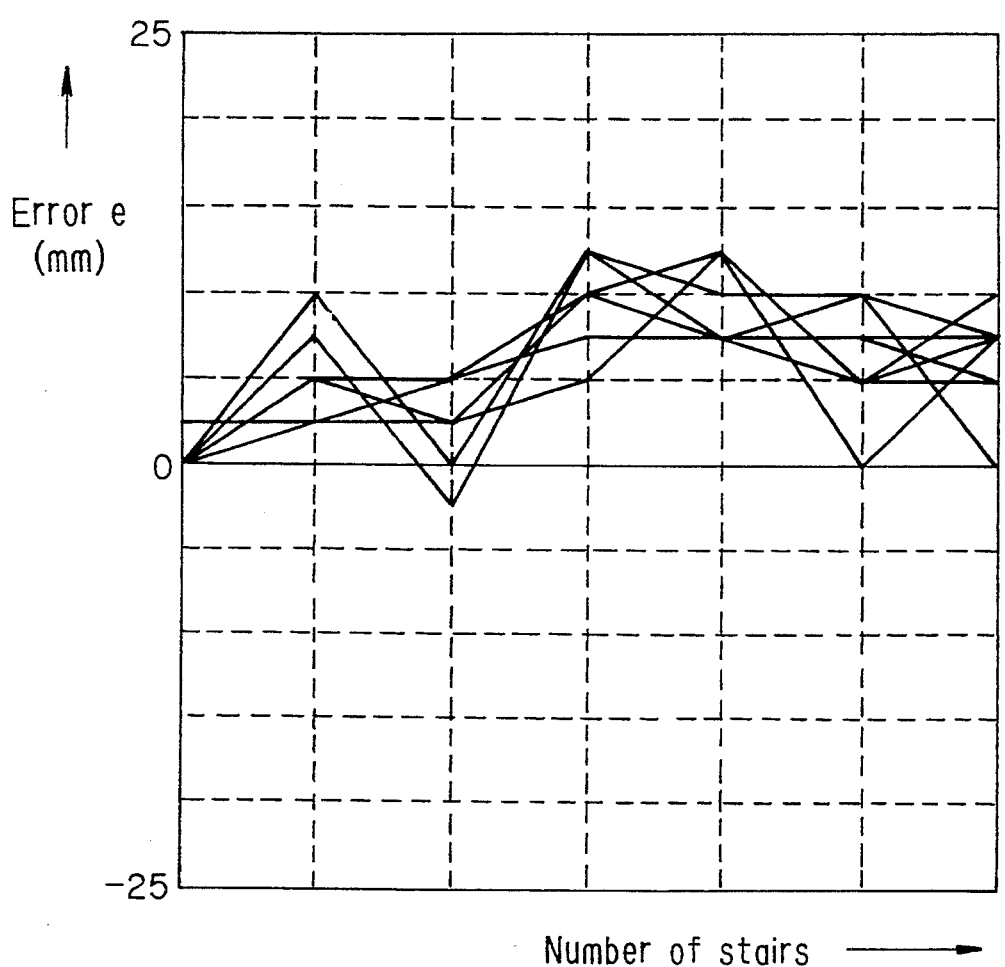

FIGS. 9 to 11 show test data. FIG. 9 shows the case in which the control according to the invention was not conducted. FIGS. 10 and 11 show the cases in which the control according to the invention were conducted.

FIG. 10 shows the case in which k=0.5 and FIG. 11 shows the case in which k=0.75. The stair length L was 280 mm throughout the tests. As apparent from FIG. 9, when the control was not conducted, the relative positional errors increased almost linearly and exceeded 20 mm at the third or fourth stair. When the control was conducted, on the other hand, it can be seen from FIGS. 10 and 11 that the relative positional errors did not increase and did converge at a certain value. The relative positional error converged at 10 mm when k was 0.5 (FIG. 10) and converged at 7.5 mm when k was 0.75 (FIG. 11). From Equation 4, assuming the gain g as 1.02, the error will be 11 mm when the gain k is 0.5, while the error will be 7 mm when the gain k is 0.75. Thus, it was confirmed that the control according to the invention was advantageous.

Based on the foregoing, the operation of the system will now be explained with reference to the flow chart of FIG. 5, taking the stairs illustrated in FIG. 7 as an example of the environment. Namely, the robot of FIG. 1 is controlled its locomotion to climb the stairs. The program illustrated in the flow chart starts at every time interval of 20 ms.

The program begins with step S10 in which the system is initialized and advances to step S12 in which gait parameters are read out from the ROM 64. In the embodiment, the walking parameters are preestablished solving the dynamic stability issues in terms of positions/directions of the hip joints 10,12,14R(L) (or the robot's center of gravity) and position/direction of the foot 22R(L) and are stored in the memory. The foot position/direction determine a foot landing position and hence a stride. As regards stairs, the foot landing position is defined in terms of a distance from a stair's edge to the position of the foot sole immediately below the ankle (the intersection of the ankle joints 18,20R(L)), as will be understood from FIG. 7. The program then advances to step S14 in which the system waits for a start signal. If a start signal occurs, the system proceeds, to step S16 in which a counter is incremented, and to step S18 in which a discrimination is made on wheither it is a time for determining correction of the gait parameters. This will be explained later.

If not, the program proceeds to step S20 in which posture parameters are calculated. The posture parameters are almost the same as the gait parameters. Namely, since the gait parameters include parameters obtained by interpolation, such parameters are called here as the posture parameters and are calculated there through the interpolation. The program then proceeds to step S22 in which desired angles for the 12 joints 10R(L), . . . are calculated from the posture parameters through the inverse-kinematic calculation, to step S24 in which the system waits for a synhronous signal. It it is detected, the system moves on to step S26 in which the calculated desired joint angles are output, to step S28 in which it is checked if the walking is to be terminated. If not, the program returns to step S16 and on and repeats the same procedures. On the other hand, if it is, the program goes to step S30 in which the counter is reset and the program is then terminated.

Figure 12:
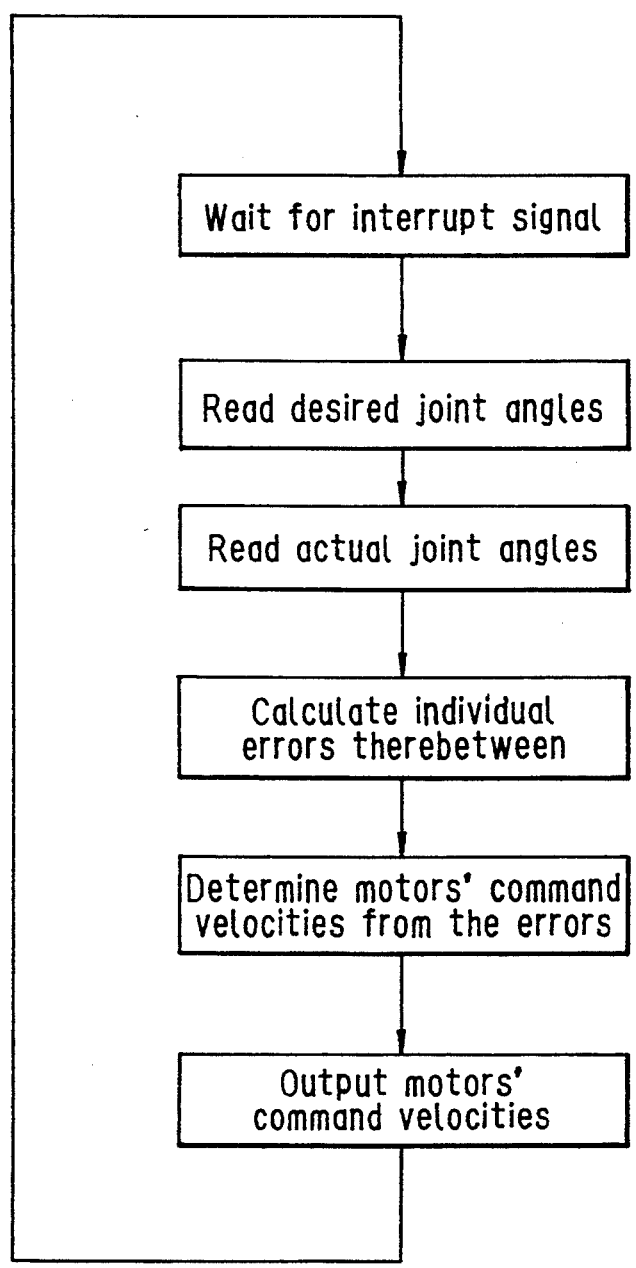
FIG. 12 is a flow chart showing the servo control based on desired joint angles determined in the procedures illustrated in the flow chart of FIG. 5.
Figure 13:
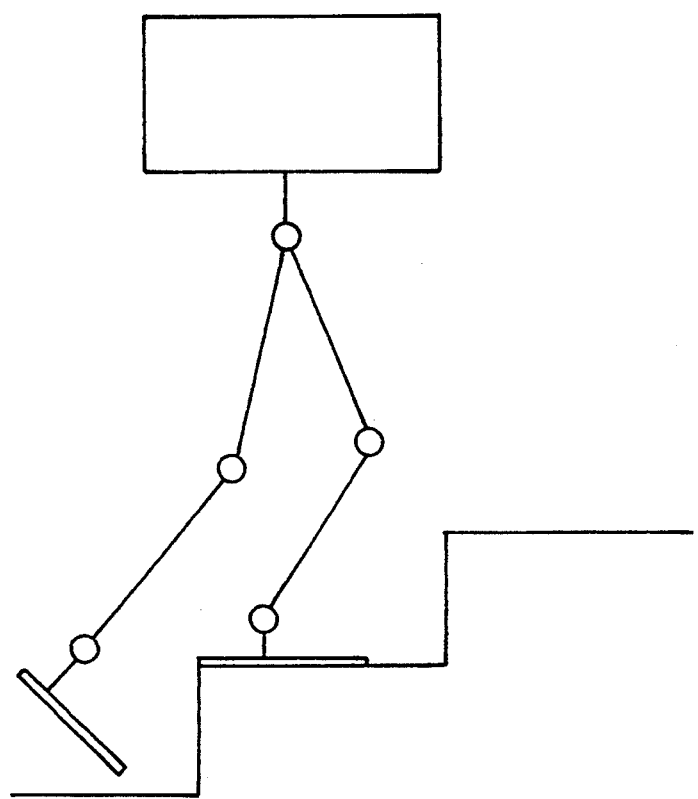
FIG. 13 is an explanatory view showing the robot illustrated in FIG. 1 is climbing stairs.

On the basis of the desired joint angles output at step 26 the second processor 62 carries out the servo control in accordance with a flow chart illustrated in FIG. 12. Since, however, the control is well-known, explanation will therefore be omitted. Also, although a stabilization control may be carried out using output of the inclinometer or the like, it is omitted from illustration in the flow chart of FIG. 5.

Now returning to step S18, the time is set to be a time at which a foot is lifted from a floor (stair). Thus, by detecting the relative positional error to be fed back to the initial foot land position before the foot is lifted, it becomes possible to obtain an ample period for correcting the trajectory until the lifted foot is again landed, so that the trajectory can be corrected with smoothness and posture stability's degradation resulting from the correction will be decreased to the minimum. Moreover, with the arrangement, it becomes possible to use the most current relative positional error information in the correction. Thus, the gait parameters' correction, if it does, is conducted once per walking step.

If it is confirmed at step S18 that it is the foot lifting time (the time for correction), the program advances to step S32 in which the position of the edge of the stair at the foot sole is detected through the outputs of the tactile sensor 38 and a distance from the stair edge to the aforesaid foot sole position immediately below the ankle is detected. The detected distance is then compared with the value resulting from the gait parameters to detect the relative positional error therebetween. The program then advances to step S34 in which the amount of correction of the desired stride is determined in response to the detected relative positional error such that the error is not accumulated, and to step S36 in which the gait parameters are corrected and the initial foot landing position is modified such that the stride is varied as corrected. For example, when the error is found to be +20 mm and the gain k is 0.5, the next stride will then be 280 mm−(0.5×20 mm)=270 mm as will be understood from FIG. 7. It should be noted here that although the next stride is immediately corrected in response to the detected error, it is alternatively possible to leave the error as it is unless it reaches the aforesaid extent which ensures the robot's stable walking. In the tests mentioned with reference to FIGS. 9 to 11, the extent was found to be ±60 mm.

Since the foot landing position is determined by the directions in x, y and z and rotation thereabout, all or part of the gait parameters are modified such that the corrected stride will be realized. Next the gait parameters' correction is therefore discussed.

In the foregoing, it was explained that the gait parameters satisfying robot's dynamic equilibrium were established in advance and stored in the memory. This is because, since the robot has 12 degrees of freedom, if the parameters are determined real time during walking, the amount of calculation for solving the dynamic stability issues will be so large that the control unit requires a high performance computer for the computation. In the embodiment, in order to lighten the computer's burden, the parameters are designed in advance in terms of positions/directions of the foot, the hip joints (or the robot's center of gravity) and the like and are stored in the memory as time-series data. If the desired foot landing position is to be corrected as mentioned before, it becomes necessary to modify the positions/directions of the hip joints (or the robot's center of gravity). To cancel the stored one and establish new ones will be a solution. In order to again decrease the computer's burden to the least, however, the correction is conducted in the embodiment by modifying the stored data. The hip joints' correction is conducted in a manner explained below such that the foot landing position can freely be corrected as desired in the three-dimensional space.

Namely, the amount of correction in the hip joints' positions/directions will eventually be equal to the amount of correction in the foot landing position/directions. It therefore becomes possible to calculate the eventual hip joints' positions/directions by coordinate's parallel translation or rotation. Any transitional positions/directions will also be calculated in the same manner. It should here be noted that the parameters should be corrected gradually to target values by a scheduled foot landing time keeping displacement acceleration to be continuous. With the arrangement, it becomes possible to correct the positions/directions of the hip joints without degrading walking stability expected in the predesigned gait parameters. Moreover, the robot's dynamic stability issues often involve a problem of nonlinearity. Therefore, without using such a simple displacement acceleration as is expressed by polynomials of 5th order or the like, but with using displacement acceleration expressed taking the robot's intrinsic character into account, stability degradation affected by parameters' correction can be decreased to the minimum. In the embodiment, by using the latter method, it was confirmed that foot landing position could be corrected by ±50 mm at a time, while keeping the robot's posture stable.

As mentioned hereinbefore, the invention was made by contemplating the fact that the robot's walking would not fail unless the relative positional error is within the admissible extent. Further, since the control is configured such that determination to correction is only carried out at the time of foot lifting, in other words, since no frequent determination is carried out, it becomes possible to make the robot's walking speed higher than that in the aforesaid first prior art technique. Furthermore, the invention is advantageous over the second prior art technique, since performance of a microcomputer required in the system is not so high as that used in the prior art technique and hence, system structure becomes less complex.

It should be noted that, although the relative positional error is detected in the back and forth direction relative to the robot's walking direction, it is alternatively possible to determine the error in the left and right direction. When stairs have no guardrail, that will be helpful in preventing the robot from falling down from its side. Moreover, it is alternatively possible to carry out the determination of parameters' correction at a time other than foot lifting.

It should further be noted that although the environment comprising stairs are used as an example of the environment in which robot motion is restricted, the invention will similarly be applied to any other environments such as;
1. walking on railroad ties;
2. walking on a rail of railroad;
3. walking along a straight, curved or staggered path;
4. reaching or passing a goal or a transitional point at a predetermined time;
5. walking up or down a spiral staircase.

In conclusion, the invention is applied to any robot's control insofar as the control involves a discrete, irrespective of whether it is positional or directional, manipulated variable. Needless to say, the invention will also be applied to the case in which the two kinds of manipulated variables are concerned such as going up or down a spiral staircase.

It should further be noted that, although the biped locomotion robot is disclosed in the embodiment as an example of a mobile robot, the invention will also be applied to one legged or three or more legged robot. If the invention will be applied to robots having three or more legs, desired foot land position will be corrected for each leg in response to the error detected for the leg or legs. Alternatively, when the sum of the errors for a leg or legs come close to an admissible limit, desired foot landing position will then be corrected for a leg or legs.

It should further be noted that the invention will also be applied to a robot other than the legged one if it has a discrete floor contact position.

It should further be noted that, although the conductive rubber tactile sensor is used in the embodiment for detecting the relative positional error, it is alternatively possible to use an optical sensor, an ultrasonic sensor or a vision sensor and the like.

What is claimed is:

1. A system for controlling locomotion of a legged mobile robot having a plurality of legs and which can ascend or descend stairs, comprising:
   first means for determining a desired landing position at which a distal end of a robot leg is to be landed on a first step of the stairs relative to the edge of the first step;
   second means for detecting an actual landing position at which the distal end of the leg landed on the first step of the stairs
   third means for determining an error between the desired landing position and the actual landing position on the first step and for comparing the error with a predetermined value; and
   fourth means for determining a corrected desired landing position at which another robot leg is to be landed on a second step of the stairs, in response to the error if the error is found to exceed the predetermined value.

2. A system according to claim 1, wherein said fourth means corrects the desired landing position on the second step after a distal end of the another robot leg is lifted from a third step of the stairs adjacent to the first step and opposite from the second step.

3. A system according to claim 1, wherein the legged mobile robot is a biped robot and the distal end is a foot of the robot.

4. A system according to claim 2, wherein the legged mobile robot is a biped robot and the distal end is a foot of the robot.

5. A system according to claim 1, wherein said fourth means corrects the desired landing position on the second step in position and direction in response to the error.

6. A system according to claim 2 wherein said fourth means corrects the desired landing positons on the second step in position and direction in response to the error.

7. A system according to claim 1, wherein said fourth means corrects the desired landing position in response to a valve obtained by multiplying a gain by the error.

8. A system according to claim 7, wherein the gain is no more than 1.

9. A system according to claim 8, wherein the gain is a value between 0.5 to 0.75 when the first step, second step, and third step are constant in length.

10. A system according to claim 2, wherein siad fourth means corrects the desired landing position in response to a value obtained by multiplying a gain by the error.

11. A system according to claim 10, wherein the gain is no more than 1.

12. A system according to claim 11, wherein the gain is a value between 0.5 to 0.75 when the first step, second step, and third step are constant in length.

13. A system for controlling locomotion of a legged mobile robot having a plurality of legs which can ascend or descend stairs, comprising:
 first means for determining a desired landing position at which a distal end of a robot leg lands on a first step of the stairs;
 second means for detecting an actual tanding position at which the distal end of the leg lands on the first step of the stairs;
 third means for determining a first error between the desired landing position and the actual landing position at the first step and adding it to a second error between a desired landing position and an actual landing position at a second step adjacent to the first step and comparing the combined errors with a predetermined value; and
 fourth means for correcting a desired landing position at which another robot leg lands on a third step adjacent to the first step and opposite the second step in response to the added error, if the added error is found to exceed the predetermined value.

14. A system according to claim 13, wherein said fourth means corrects the desired landing position on the third step after an distal end of the another leg is lifted from the second step of the stairs.

15. A system according to claim 14, wherein the legged mobile robot is a biped robot and the distal end is a foot of the robot.

16. A system according to claim 14, wherein said fourth means corrects the desired landing positons on the third step in position and direction in response to the added error.

17. A system according to claim 13, wherein the legged mobile robot is a bipbed robot and the distal end is a foot of the robot.

18. A system according to claim 2, wherein said fourth means corrects the desired landing position;
 said object is a stair;
 said first means detects a relative relationship at a n-th stair between the robot foot and the stair; and
 said second means determines a desired value on the third step in position and direction in response to the combined error.

19. A system according to claim 13, wherein said foruth means corrects the desired landing position in response to a value obtained by multiplying a gain to the added error.

20. A system according to claim 19, wherein the gain is no more than 1.

21. A system according to claim 20, wherein the gain is a value between 0.5 and 0.75 when the first step, second step, and third step are constant in length.

* * * * *

UNITED STATES PATENT AND TRADEMARK OFFICE
CERTIFICATE OF CORRECTION

PATENT NO. : 5,402,050
DATED : March 28, 1995
INVENTOR(S) : Nobuaki Ozawa

It is certified that error appears in the above-indentified patent and that said Letters Patent is hereby corrected as shown below:

```
Column 10, line 56, change "positons" to --positions--.
Column 10, line 61, change "valve" to --value--.
Column 10, line 67, change "siad" to --said--.
Column 11, line 14, change "tanding" to --landing--.
Column 12, line 7, change "positons" to --positions--.
Column 12, line 11, change "bipbed" to --biped--.
Column 12, line 13, change "claim 2," to read --claim 13,--.
Column 12, line 22, change "foruth" to --fourth--.
Column 12, line 23, change "to" to --by--.

Column 12, line 1, change "an" to --a--.
Column 12, line 15, delete the complete phrase "said object
is a stair;" so that line 16 now becomes line 15.
```

Signed and Sealed this

Twenty-fourth Day of September, 1996

Attest:

BRUCE LEHMAN

Attesting Officer

Commissioner of Patents and Trademarks